No. 10,967.
PATENTED MAY 23, 1854.
T. S. STEADMAN.
CLOVER HARVESTER.
2 SHEETS—SHEET 1.
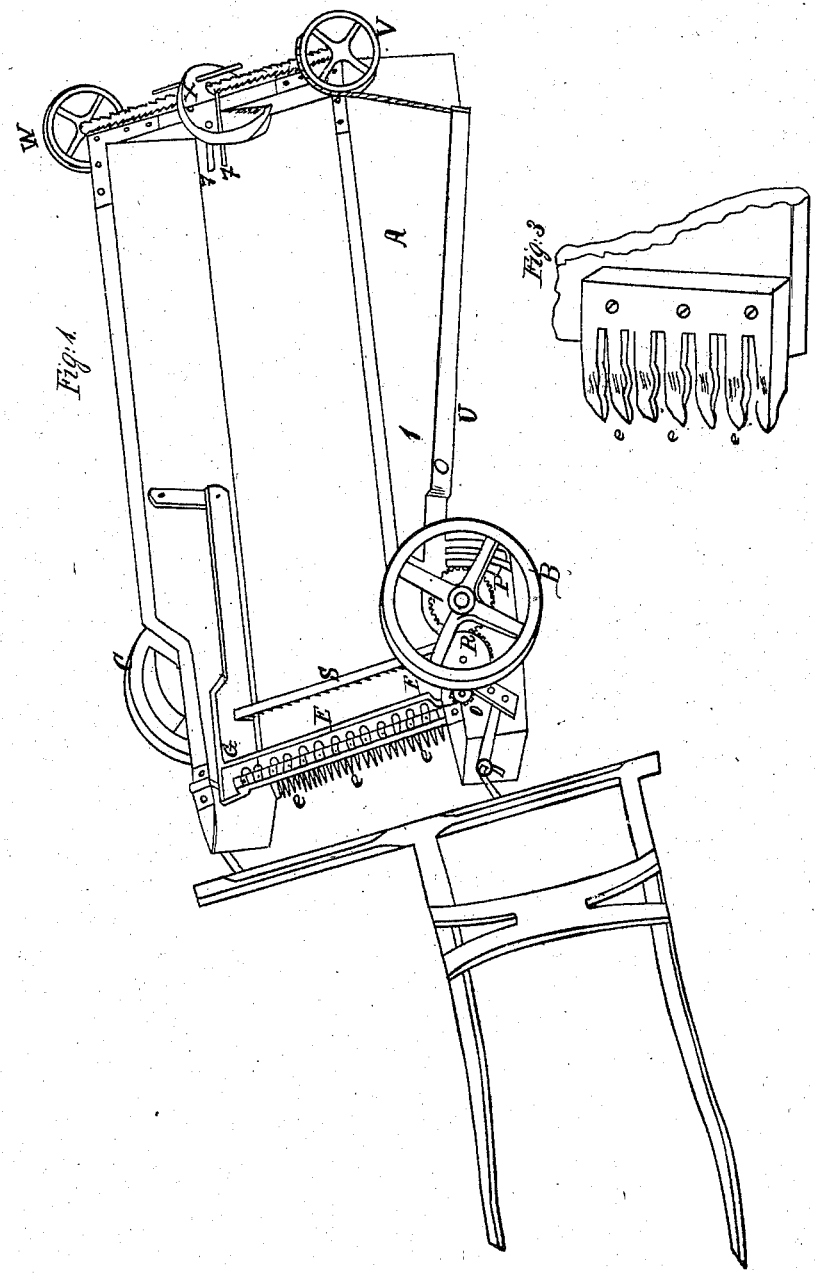

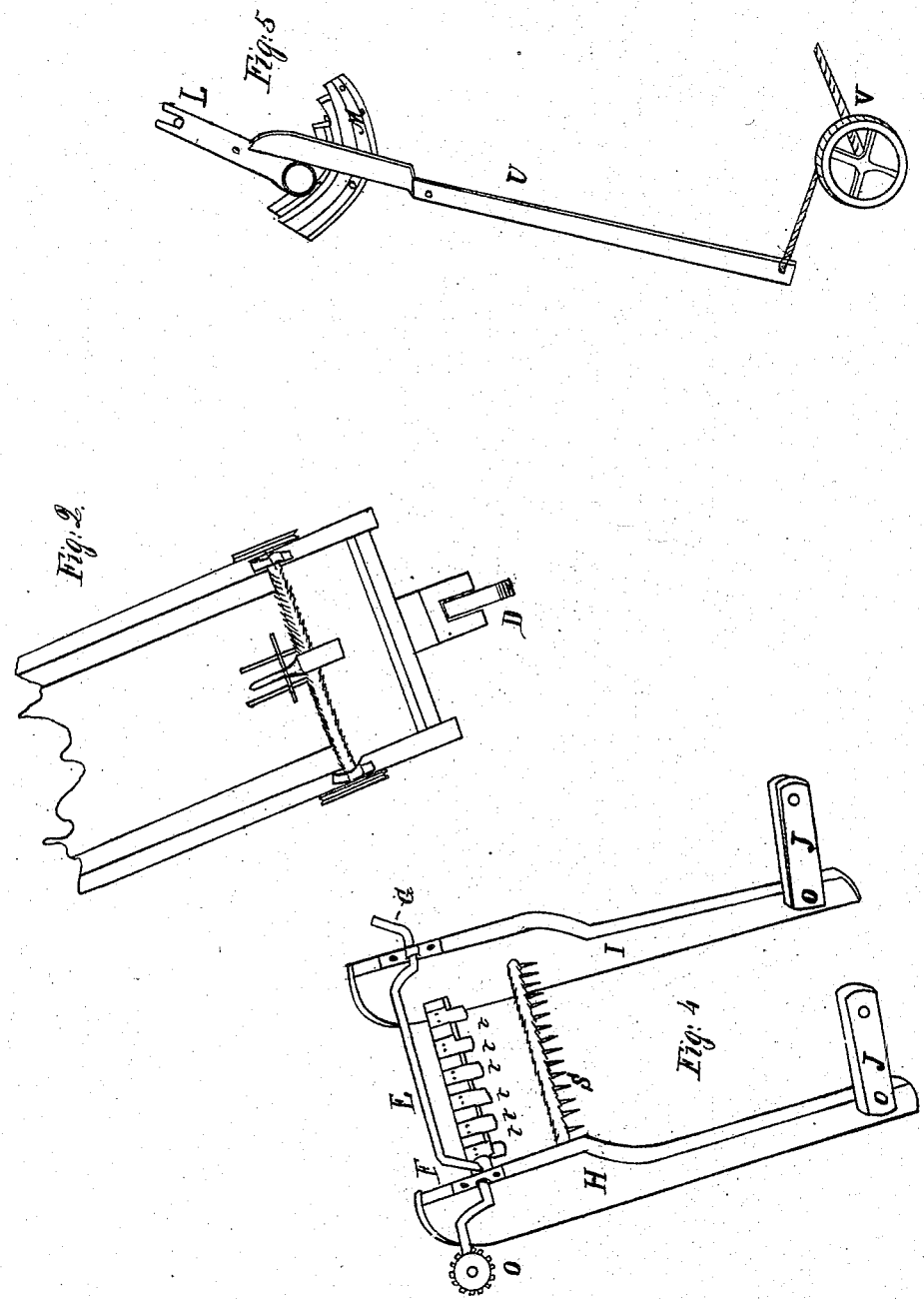

UNITED STATES PATENT OFFICE.

THOMAS S. STEADMAN, OF MURRAY, NEW YORK.

IMPROVEMENT IN CLOVER-HARVESTERS.

Specification forming part of Letters Patent No. 10,967, dated May 23, 1854.

*To all whom it may concern:*

Be it known that I, THOMAS S. STEADMAN, of the town of Murray, county of Orleans, State of New York, have invented certain new and useful Improvements in Clover and Grass Seed Harvesters; and I do hereby declare that the following is a full, clear, and exact description of the construction and operation of the same, reference being had to the annexed drawings, making part of this specification, in which—

Figure 1 is a perspective view of the machine; Fig. 2, an elevation of the rear end of the machine; Fig. 3, a view of the comb; Fig. 4, a view of the cutters and rake; Fig. 5, a view of the arms and levers.

The box A is five feet wide, ten feet long, and one and a half foot high, may be more or less, and it is placed on three wheels. The wheels B and C, near the front end of the box, are three feet in diameter. The wheel D, (seen in Fig. 2,) which carries the rear end of the box, is one and a half foot in diameter, and is attached like a caster, that it may adjust itself to the motion of the machine when turning. The front end of the box A is open, and has a comb extending across the width of it, which is attached to the bottom. This comb is formed of the teeth $e\ e\ e\ e$, twenty in number, or more or less, according to the width of the machine. These teeth are sixteen inches long, one and a half inch broad, and made of common spring-steel three-sixteenths of an inch thick, and are curved downward at the heels to suit the circle described by the knife, and the points are bent downward to take up grass or clover that is laid. Over this comb is placed the crank-shaft E, which has its bearings on the upper edges of the side pieces of the box A. The cranks F and G are six or eight inches long. To these cranks the front ends of the pieces H and I are attached, which are of wood, and are four or five feet in length. The rear ends of these pieces are attached to the lower ends of the swinging arms J J. The upper ends of these arms are attached to the upper edges of the side pieces of the box A by bolts, and when the machine is in motion they swing back and forth.

A bar of wood or iron is attached to the under side of the front ends of the pieces H and I, to which the cutters $fff$ (ten in number) are attached. These cutters are angled on both sides, being two inches wide at the heels, or where they are attached to the cutter-bar, and one and a quarter inch at the point, and are six or seven inches long. These cutters are arranged, the center of each cutter over the center of every alternate tooth in the comb; hence there are only half as many cutters as there are teeth in the comb, and every cutter cuts over two spaces between the comb-teeth. A straight cutter may be used in some cutting, but it is believed not as well.

The pinion $o$ is attached to the crank-shaft E. The cog-wheel P is attached to the driving-wheel B. The wheel P and pinion $o$ are connected by the intermediate cog-wheel, R, which is inserted in order to give the cutters a backward motion as they pass over the comb. The crank-shaft E has about six motions to one revolution of the driving-wheel. Thus, as the machine advances, the cutters revolve with the cranks F and G and pass over the comb with a rapid motion, and cut whatever may be between the comb-teeth and throw it back into the box A.

In order to move the cut seed farther away from the cutters and prevent the cutters from choking, the rake S is used, which is attached to the pieces H and I about sixteen or eighteen inches back of the cutters, and the seed that is cut and thrown back by the cutters at one motion is taken by the rake at the next motion and thrown still farther back; and as many of these rakes may be used as may be desired.

In order that these machines be adapted to the varied circumstances under which they have to be used, it is necessary that they be so constructed that they can be conveniently raised and lowered even when in motion. To provide for this the axles of the wheels B and C, which are of cast-iron, have each an arm, L, Fig. 5, extending forward alongside of the box A up to the shaft E, and have slats on the front ends to receive the shaft E and segment-shaped arms on the rear ends. These segments have tongues or lips that work under the flanges M, that are made fast to the box A. Thus the axles are left to play freely up and down on the sides of the box A; and to hold them down and to keep the box up from the ground the lever U and one like unto it on the opposite side are used, which are attached to the box by bolts at 1, Fig. 1, and the front ends rest on the axles of the wheels B and C. To the rear ends of these levers there are cords attached, which connect them to the pulleys V and W. These pulleys are attached to shafts that extend to the plate X, and are operated by the levers $y\ y$; and when it is desired to raise the machine—for instance, at B—the operator takes hold of the lever $y$ and pulls it back, and if he desires to keep the machine up he puts a pin over the lever into the plate X, and the other side is raised in like manner. By this arrangement either side is raised or both sides raised and lowered to suit circumstances, even when the machine is in motion; and the wheels being left free to play down from the levers, when the box is raised the wheels keep to the ground, when the box passes over stones or other obstructions, which is an important feature in the operation of this machine.

In order that the three cog-wheels be always kept in place, the intermediate wheel, R, has its axis attached to the arm L of the axle of the wheel B, that extends up to the shaft E. The wheel R is removed from its place when it is desired to throw the cutters out of gear.

The machine is drawn by one horse attached by thills at the front end.

What I claim as my invention, and desire to secure by Letters Patent, is—

1. The arrangement of the cutters, in combination with the comb, operating in the manner and for the purposes described.

2. The rake S, in combination with the cutters, as described.

T. S. STEADMAN.

Witnesses:
E. WILCOX,
ROYAL S. SALISBURY.